No. 848,026. PATENTED MAR. 26, 1907.
A. B. GOODSPEED & B. BESKOW.
METHOD OF GENERATING POWER.
APPLICATION FILED APR. 8, 1903. RENEWED APR. 9, 1906.
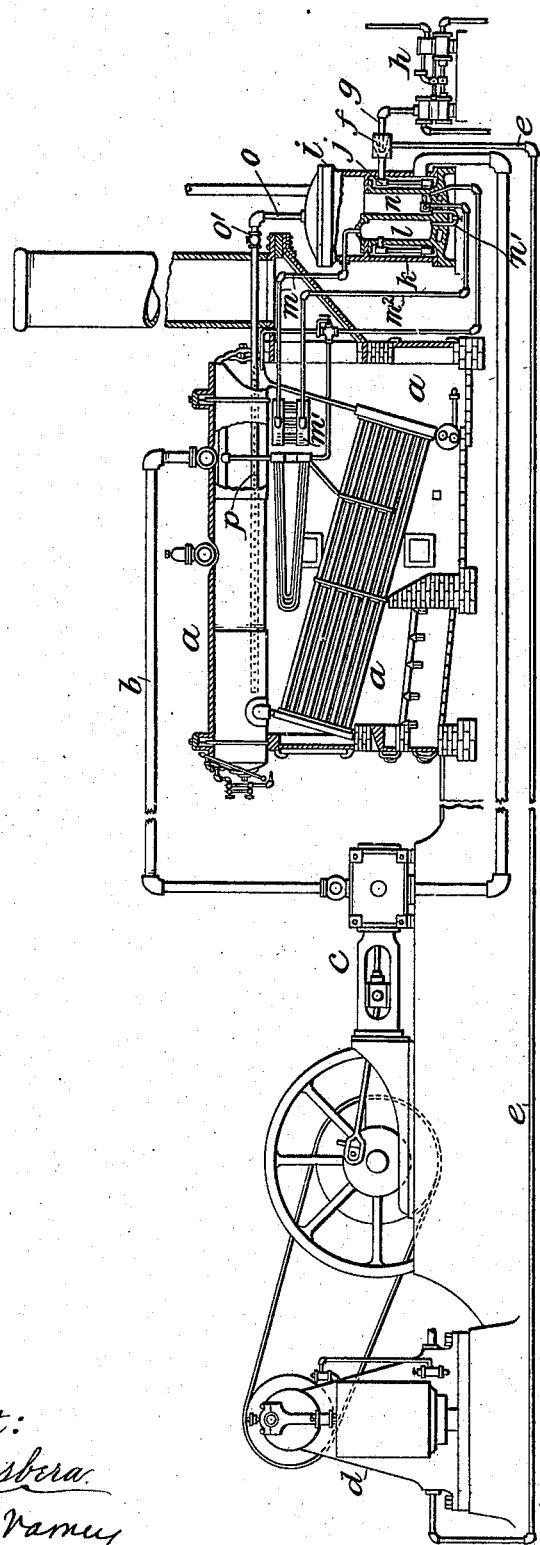

UNITED STATES PATENT OFFICE.

ARTHUR B. GOODSPEED AND BERNHARD BESKOW, OF NEW YORK, N. Y., ASSIGNORS TO INDUSTRIAL DEVELOPMENT COMPANY, OF NEW YORK, N. Y., A CORPORATION OF NEW YORK.

METHOD OF GENERATING POWER.

No. 848,026.      Specification of Letters Patent.      Patented March 26, 1907.

Application filed April 8, 1903. Renewed April 9, 1906. Serial No. 310,741.

*To all whom it may concern:*

Be it known that we, ARTHUR B. GOODSPEED and BERNHARD BESKOW, citizens of the United States, residing in the borough of Manhattan, of the city of New York, in the State of New York, have invented certain new and useful Improvements in Methods of Generating Power, of which the following is a specification, reference being had to the accompanying drawings, forming a part hereof.

The object of this invention is to increase the efficiency of steam-generating plants. To accomplish this general object, advantage is taken of the capacity of air (including other gaseous bodies) to take up or to be charged with aqueous vapor through contact of the air under suitable conditions with water, and the air so charged, as nearly as possible to the point of saturation, is forced into the boiler of the steam-generating plant, where it mingles with the steam, and by the conditions thus acquired the available power developed in the boiler is largely increased over the maximum possible with steam alone. The waste heat of the steam plant, including that from the fire-box, as well as that from the exhaust-steam, is made use of to increase the capacity of the air to take up aqueous vapor, and power developed in the plant is used to compress the air sufficiently to force it into the boiler against the steam-pressure, the power required for this purpose being but a small part of the increased power derived by the practice of the method.

In brief, the method consists in generating steam in a boiler and charging air (including other gaseous bodies) with aqueous vapor and introducing it into the boiler of the steam-generating plant, where it may mingle with the steam preparatory to the use of the steam in a motor. In the particular operation of the method for the production of the most satisfactory results the air to be charged with aqueous vapor is compressed either at one operation or by progressive operations until the pressure is slightly in excess of the steam-pressure in the boiler. The charging of the air with aqueous vapor is also carried on until the air is charged nearly to saturation under the conditions of pressure and temperature which obtain, and to increase the capacity of the air for moisture it is heated, the waste heat of the steam-generating plant being utilized for this purpose. Preferably the air, partially charged with aqueous vapor, is reheated and returned again to the presence of the water that it may absorb more, such reheating and further charging being repeated as many times as may be necessary to charge the air to the required degree.

It is obvious that the method thus described is itself independent of any particular form of apparatus. Nevertheless in order that the invention may be clearly understood one form of apparatus suitable for the practice of the method is shown partly in section and partly in outline in the accompanying drawing.

A steam-generating plant of ordinary construction and arrangement is represented at $a$, comprising, as usual, a fire-box, a combustion-chamber, water-tubes, and a steam-drum. This steam-generating plant is connected by a pipe $b$ with an engine $c$ of any usual or preferred type. If the power plant is complete in itself, no external means being relied upon to assist in starting up, the pressure of steam alone in the boiler is relied upon to start the engine $c$, and thereby to institute the operation of the improved method. The engine $c$ is therefore operatively connected with a compressor $d$, which may be of any suitable type, either wet or dry. The air compressed by the compressor $d$ is delivered through a pipe $e$ to the presence of water, the capacity of the air to absorb water being already increased by the rise of temperature incident to the compression. It is obviously possible to bring together in various ways the air and the water. As represented in the drawing, this may be accomplished through the medium of an aspirator, as at $f$, to which the pipe $e$ is connected, as well as a pipe $g$, from a suitable water-supply, which may be represented by the pump $h$. Also, the action of the aspirator or other means for utilizing the pressure developed may enable the compressor to be dispensed with. The water thus supplied not only furnishes the aqueous vapor to the air, but may be itself the feed-water for the boiler. To bring about a further heating of the feed-water and a further charging of the air with aqueous vapor, the air and water enter a generator or charger $i$. The details of a suitable generator or charger of this character are fully shown and described in a copending application, Serial No. 154,381, filed April 27, 1903.

For the purposes of the present description it is sufficient to state that the air and water circulate through a coil $j$ within a chamber $k$, through which the exhaust-steam from the engine $c$ is allowed to pass before it escapes. From the chamber $k$ the air, now partially charged with aqueous vapor, and the water pass into a separating-chamber $l$. The partially-saturated air is conducted from the separating-chamber $l$ by a suitable pipe $m$ to a reheater $m'$, which may be located within the combustion-chamber of the steam-generating plant near the flue, where it will absorb heat which would otherwise be wasted. From the reheater the partially-saturated and now highly-heated air is returned through a pipe $m^2$ to chamber $n$, into the bottom of which it is discharged, preferably through many outlets. The water which is separated from the air in the chamber $k$ is admitted to the chamber $n$ through a U connection $n'$, and as the pressure in the two chambers is the same the water will stand at the same height in the chamber $n$ as in the chamber $m$. There is thus in the lower part of the chamber $n$ a body of water through which the already partially-saturated and highly-heated air is forced, taking up more moisture and becoming still more nearly saturated. From the upper part of the chamber $n$ the heated and charged air is conducted through a pipe $o$, having a check-valve $o'$, into the steam-drum of the boiler. The water from the lower portion of the chamber $n$ being now itself quite hot through contact with the air heated at first by compression and afterward in the reheater may be delivered to the boiler as feed-water through the pipe $p$.

The motor fluid which is generated in the manner described and is delivered into the boiler to be mingled therein with the steam has qualities which are possessed neither by the air nor by the steam. It is in the nature of a gaseous body which is neither air nor steam, and whatever its specific qualities may be and whatever its action when mingled with the steam in the boiler may be it is certain that the results which follow from the admission of such motor fluid to the boiler are such as cannot be produced by steam alone, the efficiency of the steam-generating plant being thereby increased considerably above the maximum efficiency which it is possible to secure under precisely similar conditions with steam alone. It will be understood, of course, that the motor fluid passes with the steam to the working cylinder or cylinders of the engine and that the results herein referred to are measured by the power developed in the engine.

It will be obvious that the method herein described may be embodied in various forms of apparatus and that the references herein to apparatus are made solely for the purpose of enabling the nature of the invention to be better understood and are not to be regarded as embodying any limitation upon the method herein sought to be covered.

We claim as our invention—

1. The herein-described method of generating power which consists in generating steam and charging air with aqueous vapor and subsequently delivering the charged air into the steam-generator to be mingled therein with the steam.

2. The herein-described method of generating power which consists in generating steam and compressing air, charging it with aqueous vapor and subsequently delivering the charged air into the steam-generator to be mingled with the steam therein.

3. The herein-described method of generating power which consists in generating steam and heating air, charging the heated air with aqueous vapor and delivering the charged air into the steam-generator to be mingled therein with the steam.

4. The herein-described method of generating power which consists in generating steam and charging air with aqueous vapor, heating the charged air, further charging the air with aqueous vapor and delivering the charged air into the steam-generator to be mingled with the steam therein.

5. The herein-described method of generating power which consists in generating steam and charging air with aqueous vapor, heating the air with the exhaust-steam from the generator and delivering the charged air into the steam-generator to be mingled with the steam therein.

6. The herein-described method of generating power which consists in generating steam and charging air with aqueous vapor, heating the charged air with the waste heat from the furnace of the generator and delivering the charged air into the steam-generator to be mingled with the steam therein.

7. The herein-described method of generating power which consists in generating steam and mingling air and water to charge the air with aqueous vapor, heating the mingled air and water, separating the partially-charged air from the water, reheating the partially-charged air, further charging the heated air with aqueous vapor and discharging the charged air into the steam-generator to be mingled with the steam therein.

This specification signed and witnessed this 4th day of April, A. D. 1903.

ARTHUR B. GOODSPEED.
BERNHARD BESKOW.

In presence of—
ANTHONY N. JESBERA,
M. A. BRAYLEY.